United States Patent
Lv et al.

(10) Patent No.: US 11,340,919 B2
(45) Date of Patent: May 24, 2022

(54) TRANSITIONING APPLICATION WINDOWS BETWEEN LOCAL AND REMOTE DESKTOPS

(71) Applicant: VMware, Inc., Palo Alto, CA (US)

(72) Inventors: Lin Lv, Beijing (CN); Bo Steven Liu, Beijing (CN); Yunxia Cheng, Beijing (CN); Yunfei San, Beijing (CN); Jian Ken Song, Beijing (CN); Felix Yan, Beijing (CN); Yuping Wei, Beijing (CN); Qian Jack Liu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/909,163

(22) Filed: Jun. 23, 2020

(65) Prior Publication Data

US 2021/0397464 A1    Dec. 23, 2021

(51) Int. Cl.
*G06F 3/0481* (2022.01)
*G06F 9/54* (2006.01)
*G06F 9/451* (2018.01)

(52) U.S. Cl.
CPC ............ *G06F 9/452* (2018.02); *G06F 3/0481* (2013.01); *G06F 9/542* (2013.01)

(58) Field of Classification Search
CPC ......... G06F 9/452; G06F 9/542; G06F 3/0481
See application file for complete search history.

(56) References Cited

U.S. PATENT DOCUMENTS

| | | | |
|---|---|---|---|
| 8,970,450 B2 | 3/2015 | Momchilov | |
| 9,369,504 B1 * | 6/2016 | Pavlov | H04L 65/40 |
| 9,686,323 B1 * | 6/2017 | Helter | H04L 65/1066 |
| 2005/0114711 A1 * | 5/2005 | Hesselink | H04L 63/029 726/4 |
| 2009/0030971 A1 * | 1/2009 | Trivedi | H04L 67/06 709/203 |
| 2009/0070404 A1 * | 3/2009 | Mazzaferri | G06F 3/0484 709/202 |

(Continued)

OTHER PUBLICATIONS

Greg Shields and Don Jones, "Reverse seamless windows: The secret to local apps on remote desktops", published on Apr. 18, 2012 to https://searchvirtualdesktop.techtarget.com/tip/Reverse-seamless-windows-The-secret-to-local-apps-on-remote-desktops, retrieved Apr. 8, 2021. (Year: 2012).*

(Continued)

*Primary Examiner* — Shourjo Dasgupta

(57) ABSTRACT

The disclosure provides for transitioning application windows between local and remote desktops. Example implementations include opening a first file with a first application to generate a first application window on a first desktop window on a user display; based at least on a trigger event for transitioning the first application window from the first desktop window to a second desktop window, determining whether a second application is available for the second desktop window to produce a version of the first application window; and based at least on the second application being available: transferring the first file across a network to become a second file; and opening the second file with the second application to generate a second application window on the second desktop window, the second application window replacing the first application window on the user display. The transition may go either direction.

20 Claims, 11 Drawing Sheets

(56) References Cited

U.S. PATENT DOCUMENTS

| | | | | |
|---|---|---|---|---|
| 2012/0005269 | A1* | 1/2012 | Janssen | G06F 3/0481 709/203 |
| 2012/0324365 | A1* | 12/2012 | Momchilov | H04L 67/42 715/738 |
| 2013/0060842 | A1* | 3/2013 | Grossman | H04L 12/4641 709/203 |
| 2017/0351471 | A1* | 12/2017 | Passeri | G06F 3/033 |

OTHER PUBLICATIONS

Microsoft Community, "How to make Active window border color and taskbar icon color realy", published on Jun. 26, 2010 to https://answers.microsoft.com/en-us/windows/forum/windows_7-desktop/how-to-make-active-window-border-color-and-taskbar/45ae4d86-b64d-4cf5-bd94-d15bd56c800f, retrieved Apr. 8, 2021. (Year: 2010).*

"Demo Video of Reverse Seamless Window on Horizon", https://confluence.eng.vmware.com/pages/viewpage.action?pageId=372289943.

"HDX Local App Access for Citrix XenApp and XenDesktop 7.6", captured May 29, 2020, https://www.youtube.com/watch?v=6IxW5VW6Vdg, 1 page.

"Greatest Trick Plays in Football History", captured May 29, 2020, https://www.youtube.com/watch?v=Fj8G9dGuNkU, 1 page.

Knuth, Gabe, "Coming Soon: Windows Virtual Desktop support in Horizon Cloud on Microsoft Azure", vmware EUC BLOG, Sep. 30, 2019, 3 pages.

"Video Demo for this solution", http://url.eng.vmware.com/dbz2, retrieved Jun. 30, 2020, 2 pages.

"Windows OLE Drag-and-Drop", https://flylib.com/books/en/4.348.1.88/1/, retrieved Jun. 30, 2020, 13 pages.

"Windows Virtual Desktop", https://azure.microsoft.com/en-us/services/virtual-desktop/, retrieved Jun. 30, 2020, 18 pages.

* cited by examiner

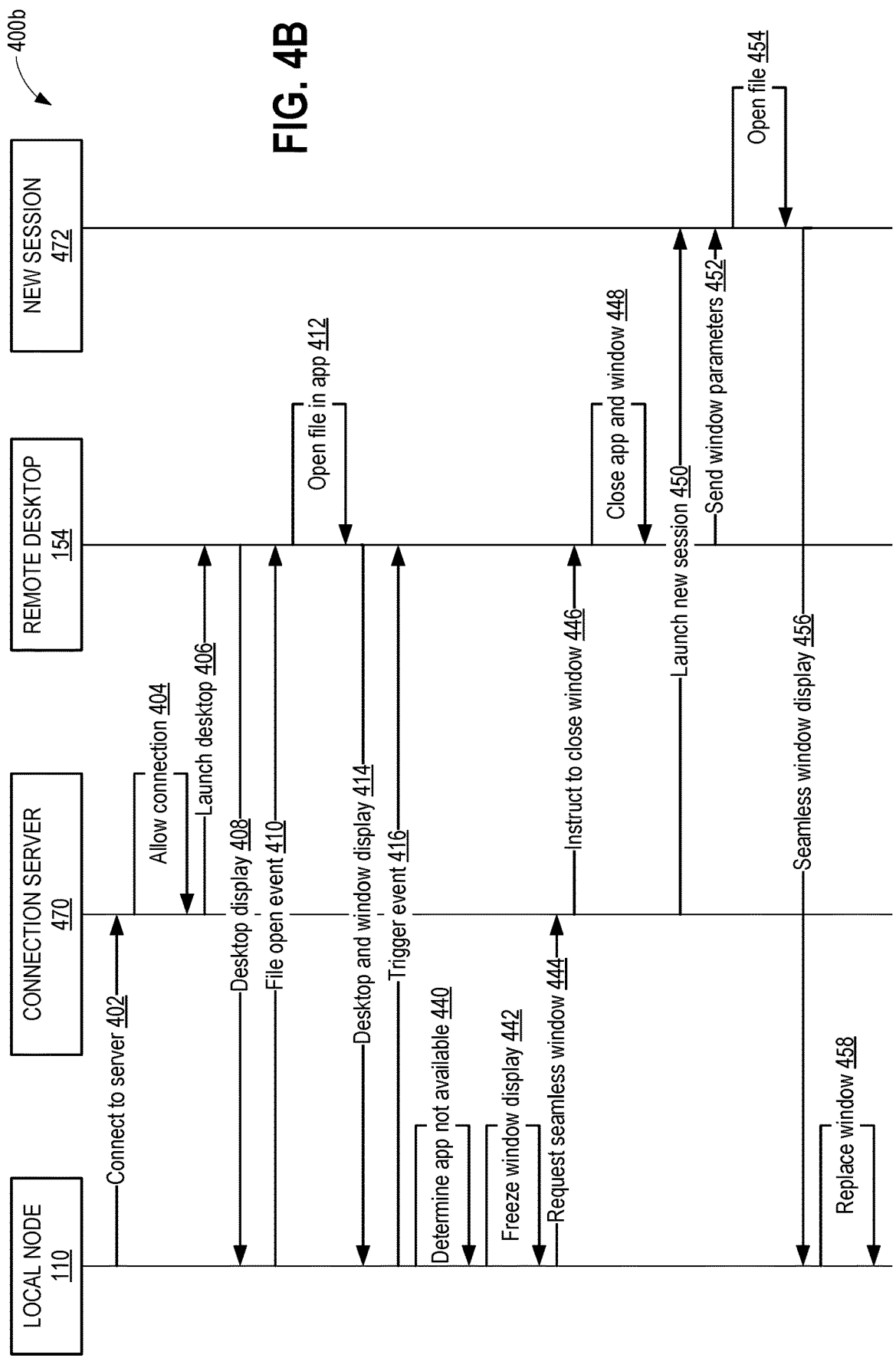

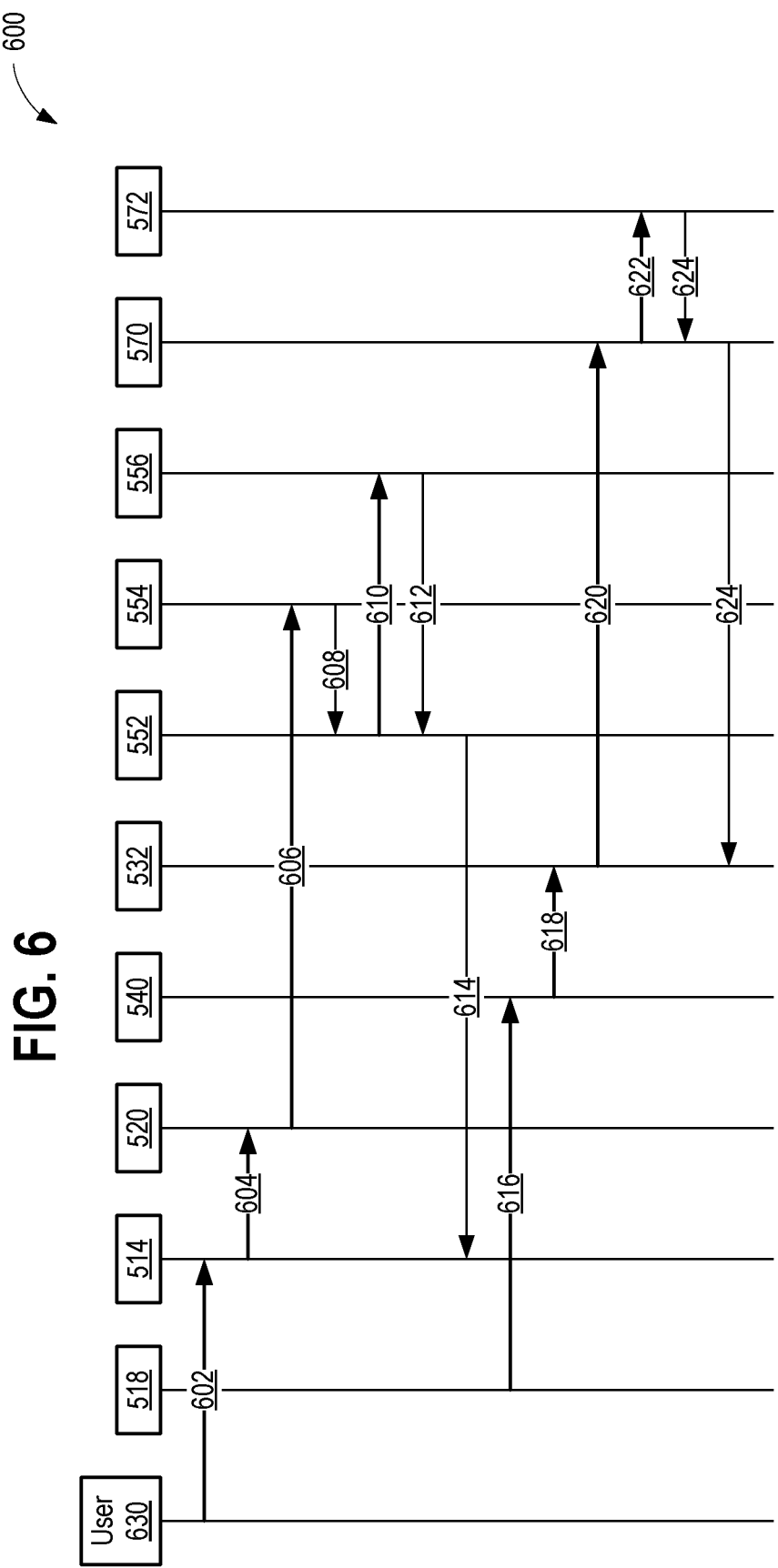

TRANSITIONING APPLICATION WINDOWS BETWEEN LOCAL AND REMOTE DESKTOPS

BACKGROUND

Virtual desktop infrastructure permits users to access applications (apps) located in the cloud (e.g., on a remote node) from anywhere, using any compatible device that is suitably connected to the proper node. The cloud-based (e.g., remote) applications run within virtual machines or other virtualized computing instances with results delivered to users over a network. A user typically sees a remote desktop window on the user's display device, with remotely executing applications' windows located within the remote desktop window. Meanwhile, locally executing application windows are located on the user's display device outside the remote desktop window.

This produces a clear bifurcation in the presentation of local versus remote applications. If a user prefers to transition execution from remote to local, the user must save the file being operated upon, close the remote application, transfer the file to the user's local node, open the transferred file with a local copy of the application, and then find the location of the file at which the user had been working, and also attempt to duplicate the window parameters (such as application settings) in the local window. This may often be a time-consuming distraction that negatively impacts user productivity if, for example, the user had carefully crafted a working environment in one domain, in order to work efficiently. The reverse transition, from local to remote, is similarly burdensome.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The disclosure provides for transitioning application windows between local and remote desktops. Example implementations include opening a first file with a first application to generate a first application window on a first desktop window on a user display; based at least on a trigger event for transitioning the first application window from the first desktop window to a second desktop window, determining whether a second application is available for the second desktop window to produce a version of the first application window; and based at least on the second application being available: transferring the first file across a network to become a second file; and opening the second file with the second application to generate a second application window on the second desktop window, the second application window replacing the first application window on the user display. The transition may go either direction. In some examples, the first file is a local file, the first application is a local application, the first desktop window is a local desktop window, the second file is a remote file, the second application is a remote application, and the second desktop window is a remote desktop window. In some examples, the first file is a remote file, the first application is a remote application, the first desktop window is a remote desktop window, the second file is a local file, the second application is a local application, and the second desktop window is a local desktop window. In some examples the transition may go from one remote desktop window to a remote desktop window at another remote node.

BRIEF DESCRIPTION OF THE DRAWINGS

The present description will be better understood from the following detailed description read in the light of the accompanying drawings, wherein:

FIGS. 4A and 4B illustrate exemplary message sequences associated with transitioning between local and remote desktops application windows, such as may occur within the architecture of FIG. 1;

FIG. 6 illustrates exemplary message sequences associated with the components of FIG. 5;

DETAILED DESCRIPTION

Figure 1:
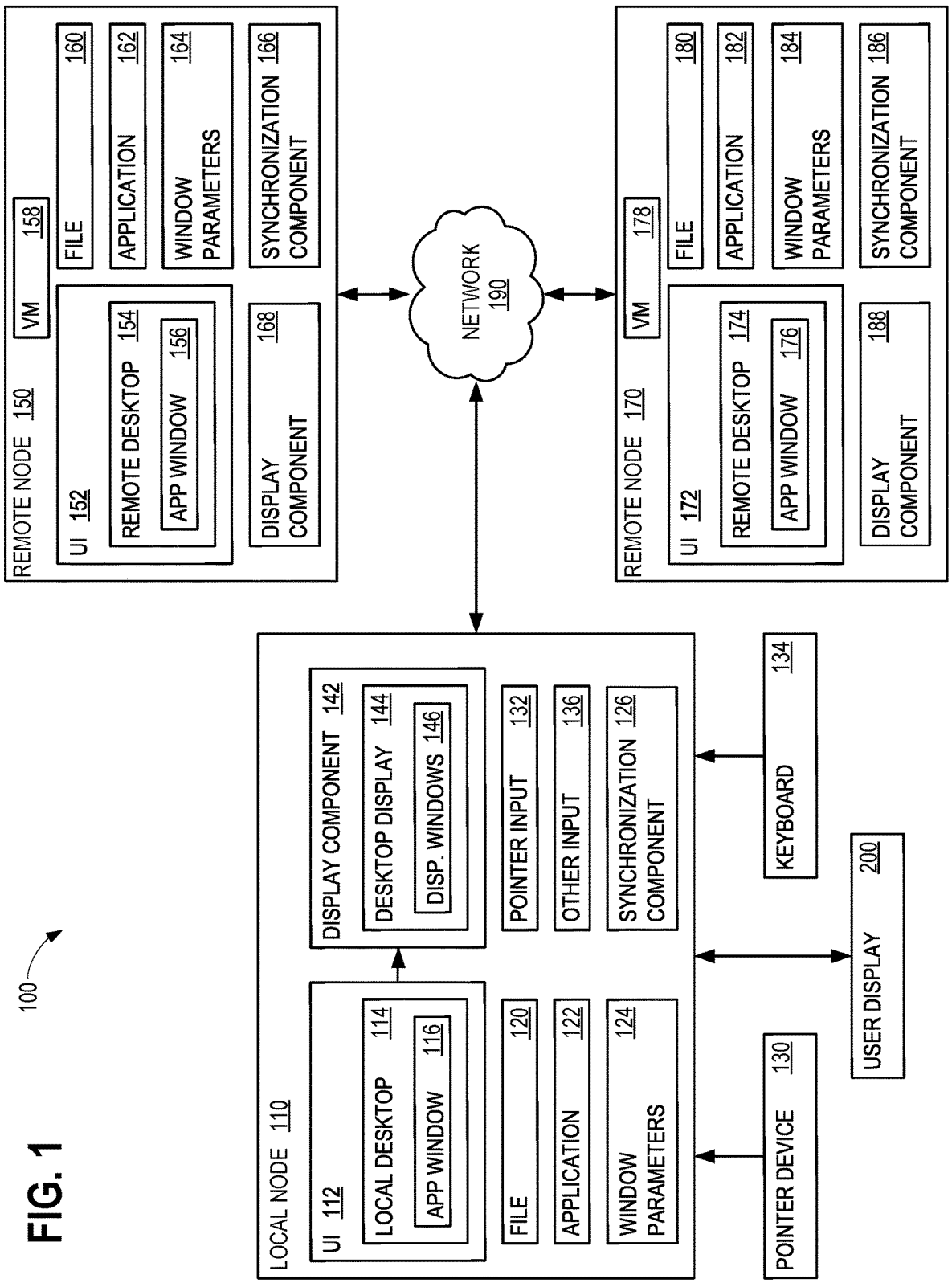
FIG. 1 illustrates a block diagram of an example architecture that can advantageously transition application windows between local and remote desktops.

Various aspects described herein provide solutions for transitioning application windows between local and remote desktops. For example, the user performs a drag-and-drop operation on an application from a remote desktop window to a local desktop window, or the reverse. This is a one-step operation, from the user's perspective, rather than a manual process of saving, moving, and reopening the file in a different working environment, among other operations. This significantly improves the user experience. Examples also permit remote application to appear to run as local applications (e.g. seamless applications) and/or also permit local applications to appear to run as remote applications (e.g. reverse seamless applications). Some examples publish applications as seamless applications or reverse seamless applications without burdening information technology (IT) administrators.

Example implementations include opening a first file with a first application to generate a first application window on a first desktop window on a user display; based at least on a trigger event for transitioning the first application window from the first desktop window to a second desktop window, determining whether a second application is available for the second desktop window to produce a version of the first application window; and based at least on the second application being available: transferring the first file across a network to become a second file; and opening the second file with the second application to generate a second application window on the second desktop window, the second application window replacing the first application window on the user display. The transition may go either direction.

In some examples, the first file is a local file, the first application is a local application, the first desktop window is a local desktop window, the second file is a remote file, the second application is a remote application, and the second desktop window is a remote desktop window. In some examples, the first file is a remote file, the first application is a remote application, the first desktop window is a remote desktop window, the second file is a local file, the second application is a local application, and the second desktop window is a local desktop window. In some examples the transition may go from one remote desktop window to a remote desktop window at another remote node.

Aspects of the disclosure provide an efficient solution that saves network bandwidth by replacing a remote application window, that is executing on a remote node and consuming network bandwidth to provide a displayed window locally, with a local application window that may not need to consume network bandwidth, or as much network bandwidth. Aspects of the disclosure improve computing operations by using fewer computing resources, and improve user experience, by simplifying the process of transitioning execution between local and remote nodes such as, for example, by transferring a file across a network and opening the transferred file with another copy of the prior-used application. This enables replacing the original application window on the user display with a new window, automatically or seamlessly for the user. Users can continue editing (or otherwise operating upon) files without interruption and the distraction of manually transferring the file and recreating the working environment.

Aspects of the disclosure also provide for the use of a seamless window, either as a default transition option, or when a local application is not available. A seamless window is an application delivery method that allows remote applications to appear to the user to be local applications, providing the user with the same experience as if the remote application is running on a local device or node. Aspects of the disclosure also provide for the use of a reverse seamless window, either as a default transition option, or when a remote application is not available. A reverse seamless window presents a local application to a remote desktop while providing the user with the same experience as if the local application is executing within a remote node in a remote desktop window. Aspects of the disclosure thus provide for simplifying the use of seamless windows and reverse seamless windows. The support of seamless and reverse seamless windows enables users to switch between desktops, even when an application is only available either locally or remotely, and the user wishes to operate on files with that application both locally and remotely.

An example use case is that a computer user (e.g., a company employee) wishes to use a music player application that is installed on their local machine, but needs to work within a virtual machine (VM) or other virtualized computing instance. Thus, the user spends their time using applications within a remote desktop, and wishes to avoid having to swap in and out of the remote desktop to control the music player application (e.g., to control track selection, fast-forwarding, and rewinding). The company's IT administrators are unlikely to install the user's music player application on the data center machines. Aspects of the disclosure enable the user to drag-and-drop the music player application from the local desktop to the remote desktop. Thus, the disclosed solution is convenient and fast for users to transfer their working environments (applications and files) between local and remote desktop or transform applications between native and seamless or reverse seamless windows without worrying about file sharing and mapping. In some examples, only drag-and-drop of open windows is required. Users are not limited by whether an application is available at the other (local or remote) node, and IT administrator burdens are reduced.

Aspects of the disclosure operate in an unconventional manner by allowing automatic transitioning of application windows between local and remote desktops, with the only user input being a drag-and-drop operation (or other user interface operation conveying a command to transition the application window between local and remote desktops).

FIG. 1 illustrates a block diagram of an example architecture 100 that can advantageously transition application windows between local and remote desktops. Architecture 100 is illustrated as having multiple nodes 110, 150, and 170, any of which may be implemented with one or more computing devices 900, described in relation to FIG. 9. A local node 110 is connected to a first remote node 150 and a second remote node 170 across a network 190. A pointer device 130, a keyboard 134, and a user display 200 are coupled to local node 110. A user of local node 110 uses VMs 158 and 178 on remote nodes 150 and 170, respectively. The user is thus able to use a local application 122 on local node 110 to operate on a local file 120, a remote application 162 on remote node 150 to operate on a remote file 160, and a remote application 182 on remote node 170 to operate on a remote file 180—all from local node 110. Although two remote nodes 150 and 170 are illustrated, it should be understood that a different number of remote nodes may be used, in some examples.

Application 122 displays open file 120 in an application window 116 on a local desktop window 114; application 162 displays open file 160 in an application window 156 on a remote desktop window 154; and application 182 displays open file 180 in an application window 176 on a remote desktop window 174. Remote desktop windows 154 and 174 are within local desktop window 114 on a user display 200, except for some seamless desktop situations in which one of remote desktop windows 154 and 174 appears on user display 200 as if it were a local desktop window. A user interface (UI) 112, for example a graphical user interface (GUI), on local node 110 produces the graphical display information for local desktop window 114 and application window 116. Similarly, a UI 152 on remote node 150 produces the graphical display information for remote desktop window 154 and application window 156, and a UI 172 on remote node 170 produces the graphical display information for remote desktop window 174 and application window 176. Although only a single application window is shown within each desktop window, this is for clarity of illustration and it should be understood that a different number of application windows may exist within the desktop windows.

Figure 2:
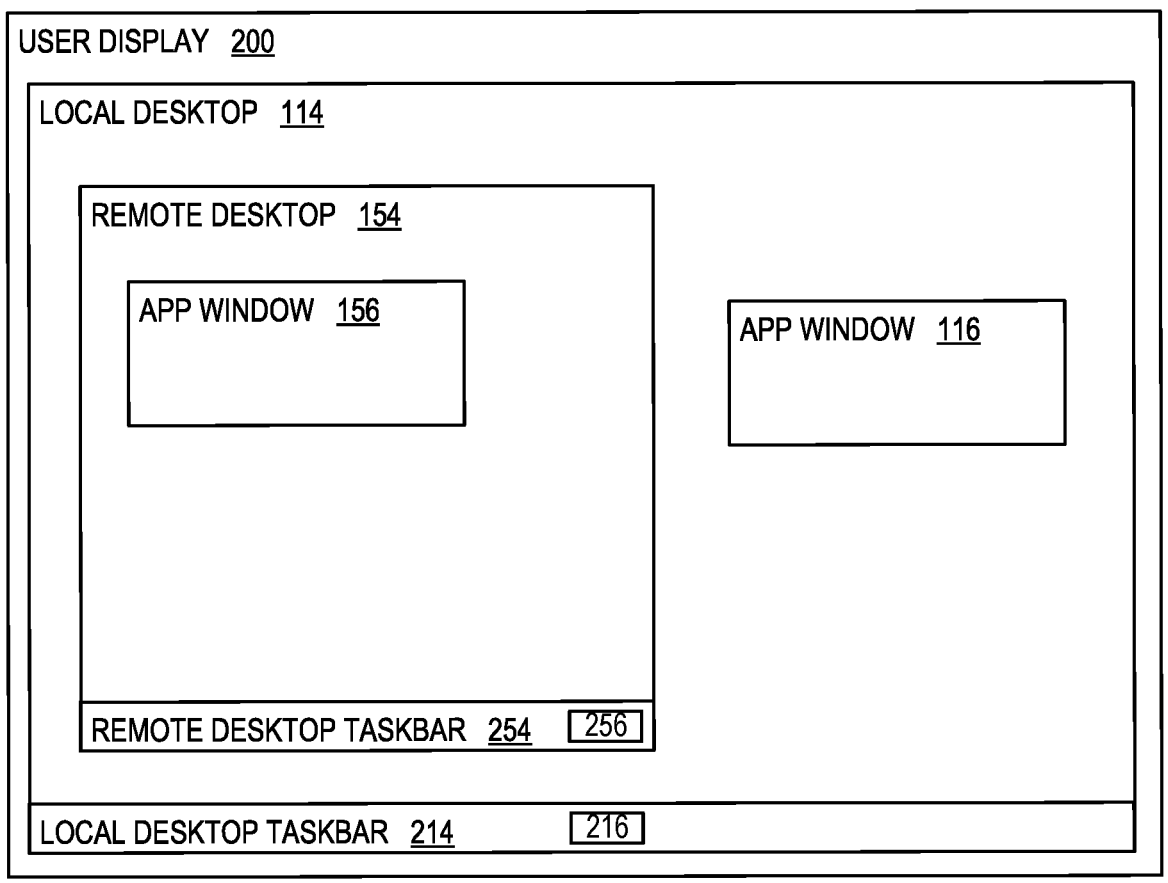
FIG. 2 illustrates exemplary local and remote desktops application windows, such as may be transitioned using the architecture of FIG. 1.

Referring next to FIG. 2, user display 200 displays local desktop window 114 with application window 116. A local desktop taskbar 214 shows an icon 216 for application window 116. User display 200 also displays remote desktop window 154 within local desktop window 114, and application window 156 is within remote desktop window 154. A remote desktop taskbar 254 shows an icon 256 for application window 156.

The user is able to provide input to local node 110, for example to execute any of applications 122, 162, and 182, and/or to transition windows between local and remote using pointer device 130 (e.g., a mouse or trackpad), keyboard 134, and/or user display 200. In some examples, user display comprises a touchscreen, to enable a user to perform dragand-drop operations without using pointer device. Input for pointer device type operations, such as drag-and-drop operations, is put into pointer input 132, and other input, such as keyboard commands (e.g., keystrokes for keyboard shortcuts) is put into other input 136. These inputs 132 and 136 are used to control the execution of applications 122, 162, and 182, as well as drag-and-drop operations to control transitioning application windows 116, 156, and 176 between local and remote desktops. In some examples, keyboard commands are also or alternatively used to control transitioning application windows 116, 156, and 176 between local and remote desktops.

Figure 3A:
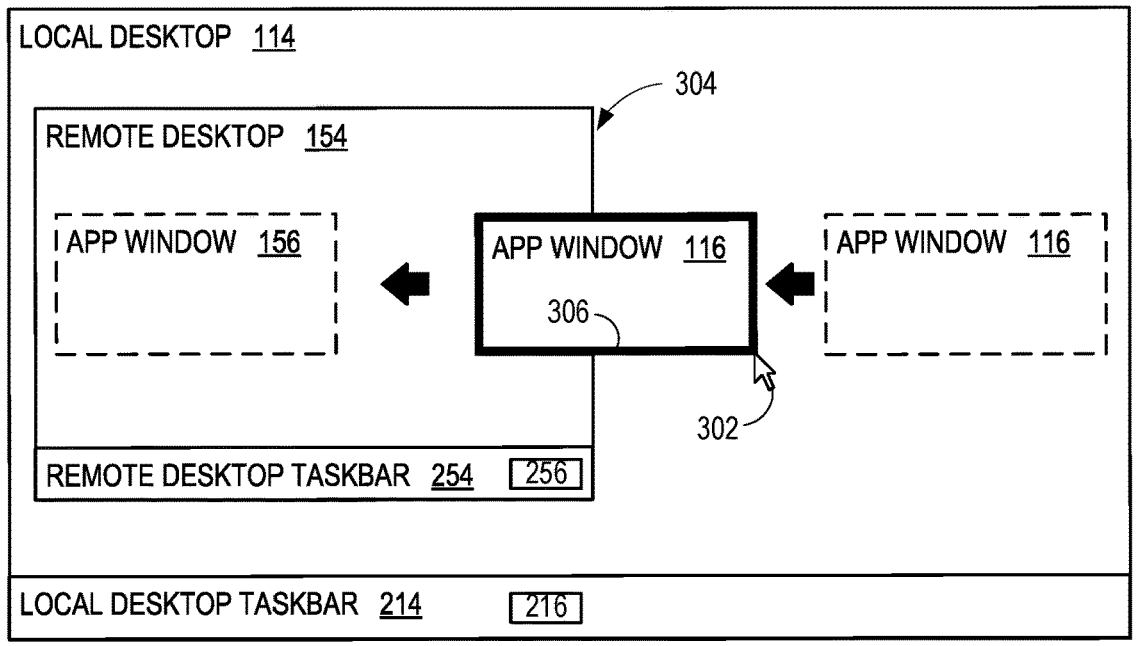
FIGS. 3A and 3B illustrate exemplary transitions between local and remote desktops application windows, such as may occur with the architecture of FIG. 1.
Figure 3B:
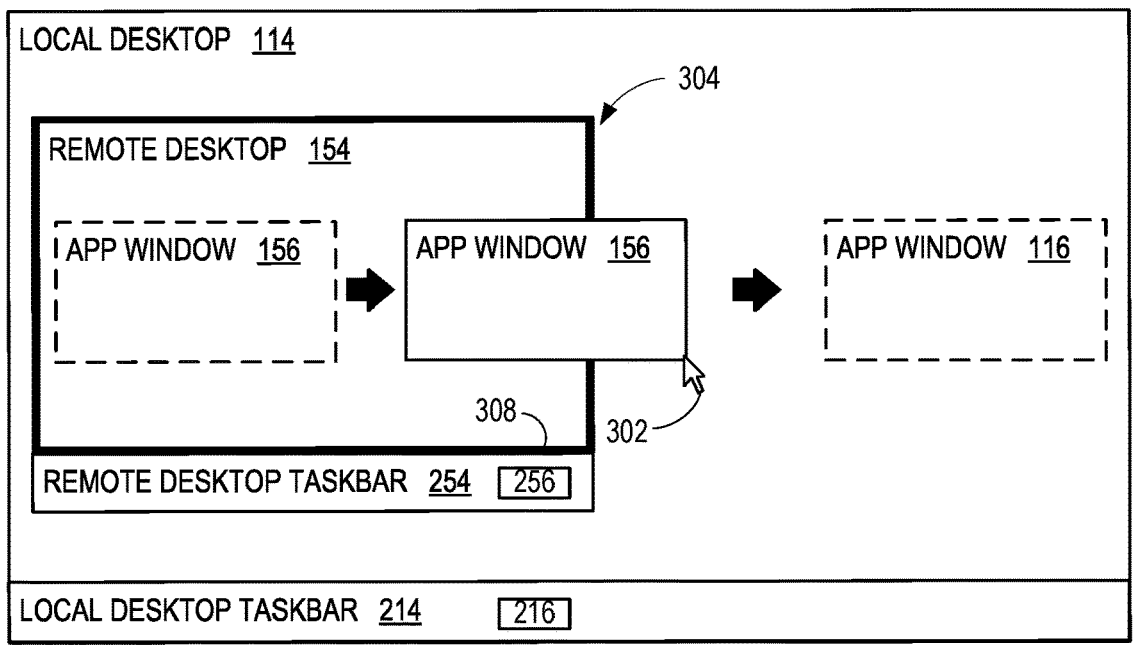

Referring next to FIGS. 3A and 3B, exemplary transitions between local and remote desktops application windows are illustrated. FIG. 3A illustrates transitioning from application window 116 on local desktop window 114 to application window 156 on remote desktop window 154. The transition occurs based at least on a trigger event. In some examples, the trigger event is a set of keystrokes (e.g., a keyboard command or keyboard shortcut). In some examples, the trigger event is a drag-and-drop operation, such as using a pointer control 302 to drag application window 116 to edge 304 of remote desktop window 154. Determining that application window 116 is positioned at edge 304 of remote desktop window 154 may occur when application window 116 approaches edge 304 by a threshold amount, first abuts edge 304, and/or when application window 116 overlaps edge 304 by a threshold amount. In some examples, a trigger event is a combination of UI event handling operations and data, such as a mouse button down event, a window position (with the mouse button still down), a time duration, and a second window position at a mouse button up event. Other trigger events may include keyboard key presses (e.g., shortcuts) to either trigger or cancel transitioning.

In some examples, any edge of remote desktop window 154 can be used for the trigger event. In some examples, application window 116 is temporarily highlighted in some manner, such as by frame 306 of application window 116 being colored or bolded, as shown. In some examples, remote desktop window 154 is also or alternatively temporarily highlighted, such as by frame 308 of remote desktop window 154 being colored or bolded, as shown in FIG. 3B. In some examples, there is a short pause for a delay period, to enable determination of whether the user intended to move application window 116 into remote desktop window 154, or whether the user continues moving application window 116 past and outside remote desktop window 154. In such examples, if application window 116 is still positioned at edge 304 of remote desktop window 154, or entirely within remote desktop window 154, at the end of the delay period, then the trigger event is detected (e.g., determined to have occurred). In some examples, the user drags application window 116 to edge 304 of remote desktop window 154 and holds the left mouse button down for approximately one second to signal an intent to transition the window, then continues dragging drags application window 116 into remote desktop window 154 and releases the left mouse button. This is the trigger event, in some examples. The delay period may be a different time, or may be customizable.

At this point, application window 116 is replaced with application window 156 in a manner that is automatic to the user. As this occurs, icon 216 for application window 116, which had been on local desktop taskbar 214 disappears, and icon 256 for application window 156 appears on remote desktop taskbar 254.

FIG. 3B illustrates the reverse transition from application window 156 on remote desktop window 154 to application window 116 on local desktop window 114. The transition occurs based at least on a trigger event. In some examples, the trigger event is a set of keystrokes (e.g., a keyboard command or keyboard shortcut). In some examples, the trigger event is a drag-and-drop operation, such as using a pointer control 302 to drag application window 156 to edge 304 of remote desktop window 154. Determining that application window 156 is positioned at edge 304 of remote desktop window 154 may occur when application window 156 approaches edge 304 by a threshold amount, first abuts edge 304, and/or when application window 156 overlaps edge 304 by a threshold amount.

In some examples, any edge of remote desktop window 154 can be used for the trigger event. In some examples, remote desktop window 154 is temporarily highlighted, such as by frame 308 of remote desktop window 154 being colored or bolded, as shown. In some examples, application window 156 is also or alternatively temporarily highlighted in some manner, similarly to the way frame 306 of application window 116 is colored or bolded, as shown in FIG. 3A. In some examples, there is a short pause for a delay period, to enable determination of whether the user intended to move application window 156 into local desktop window 114, or whether the user quickly moves application window 156 back inside remote desktop window 154. In such examples, if application window 156 is still positioned at edge 304 of remote desktop window 154, or entirely outside of remote desktop window 154, at the end of the delay period, then the trigger event is detected (e.g., determined to have occurred).

At this point, application window 156 is replaced with application window 116 in manner that is seamless to the user. As this occurs, icon 256 for application window 156, which had been on remote desktop taskbar 254 disappears, and icon 216 for application window 116 appears on local desktop taskbar 214.

In some examples, a user has both remote desktop window 154 and remote desktop window 174 open and is dragging application window 156 to remote desktop window 174 to be replaced by application window 176 (or the reverse). There are at least two scenarios for this. If both remote desktop window 154 and remote desktop window 174 are open on local desktop window 114, with space between, the process is a transition from remote node 150 to local node 110 (as described above for FIG. 3B) followed rapidly by a transition from local node 110 to remote node 150 (as described above for FIG. 3A). In some examples, such as if remote desktop window 174 is open within remote desktop window 154, or the user moves pointer control 302 rapidly enough when dragging application window 156, application window 156 is replaced directly by application window 176 without an intermediate manifestation of application window 116.

Returning to FIG. 1, the manner in which the transitions are seamless to the user are next described. Application window 116 has certain parameters, such as size and location on the screen, and application 122 also has certain settings, such as the position within file 120 that is being displayed. In some examples of application 122, for example editing, there are other settings such as toggling formatting symbol display, the displayed font, a zoom ratio, a window layout, and a navigation aid, such as a ruler, gridlines, a page preview, bookmarks, or an outline. In the absence of a seamless transition, the user would need to manually replicate all or most of these settings on the new application window. In contrast, with the disclosure, these parameters and settings for application window 116 are stored in window parameters 124, so that when transitioning from local desktop window 114 to remote desktop window 154, window parameters 124 are sent to remote node 150 for use in setting up or otherwise configuring application window 156 with application 162. Duplicating window parameters 124 as window parameters 164 permits application window 156 to appear to the user as unchanged, in at least some respects, relative to application window 116. Window parameters 124 may also be used to set up application window 176 with application 182 on remote node 170. In this manner, the transition appears seamless to the user.

Similarly, when transitioning from application window 156 to application window 116, duplicating window parameters 164 as window parameters 124 permits application window 116 to appear to the user as unchanged, in at least some respects, relative to application window 156. And when transitioning from application window 176 to application window 116, duplicating window parameters 184 as window parameters 124 permits application window 116 to appear to the user as unchanged, in at least some respects, relative to application window 176. In some examples, at least one application window parameter from the original application window is duplicated to the replacement application window. In some examples, the at least one application window parameter includes one or more of the following: window size, window position, file position, and window display options. In some examples, at least one window display option includes one or more of the following: formatting symbol display, font, zoom, layout, and a navigation aid. Navigation aids include a ruler, gridlines, a page preview, bookmarks, and/or an outline.

When a native version of application window 116 is to be replaced with a remote native version of application window 156, file 120 is transferred across network 190 to become file 160. This enables application 162 to have access to the same file content on remote node 150 as application 122 had earlier been operating upon on local node 110. The transfer of file 120 on local node 110 to become file 160 on remote node 150 is handled by synchronization component 126 and synchronization component 166. Synchronization components 126 and 166 also handle the synchronization of files 120 and 160 in the reverse direction, and thus ensure that application windows 116 and 156 are both able to display the same content to the user, as one window is replaced by the other. Similarly, synchronization component 186 handles the synchronization of file 180 with whichever of files 120 and 160 is being transferred, to ensure that application window 176 is transitioned with application window 116 or 156 in a manner that appears seamless to the user. Synchronization components 126, 166, and 186 permit the user to edit files in seamless and reverse seamless windows without worrying about where their file is stored. For example, if the user is editing file 120 and transitions to a reverse seamless window, file 120 remains current, but still useable in remote desktop window 154 (or 174). In some examples, files are synchronized in both local and remote locations.

Display component 142 includes instructions and data necessary to accomplish the transitioning operations that occur on local node 110, in coordination with display components 168 and 188. Display components 168 and 188 include instructions and data necessary to accomplish the transitioning operations that occur on remote nodes 150 and 170, respectively, in coordination with display component 142. Display component 142 further includes desktop display 144 that holds the graphical data that is placed onto user display 200, including display windows 146. Display windows 146 include whichever ones of local desktop window 114, application window 116, remote desktop window 154, application window 116, remote desktop window 174, and application window 176 are active for display. Further detail regarding display components 142, 168, and 188 is provided in relation to FIGS. 5 and 6.

Figure 4A:
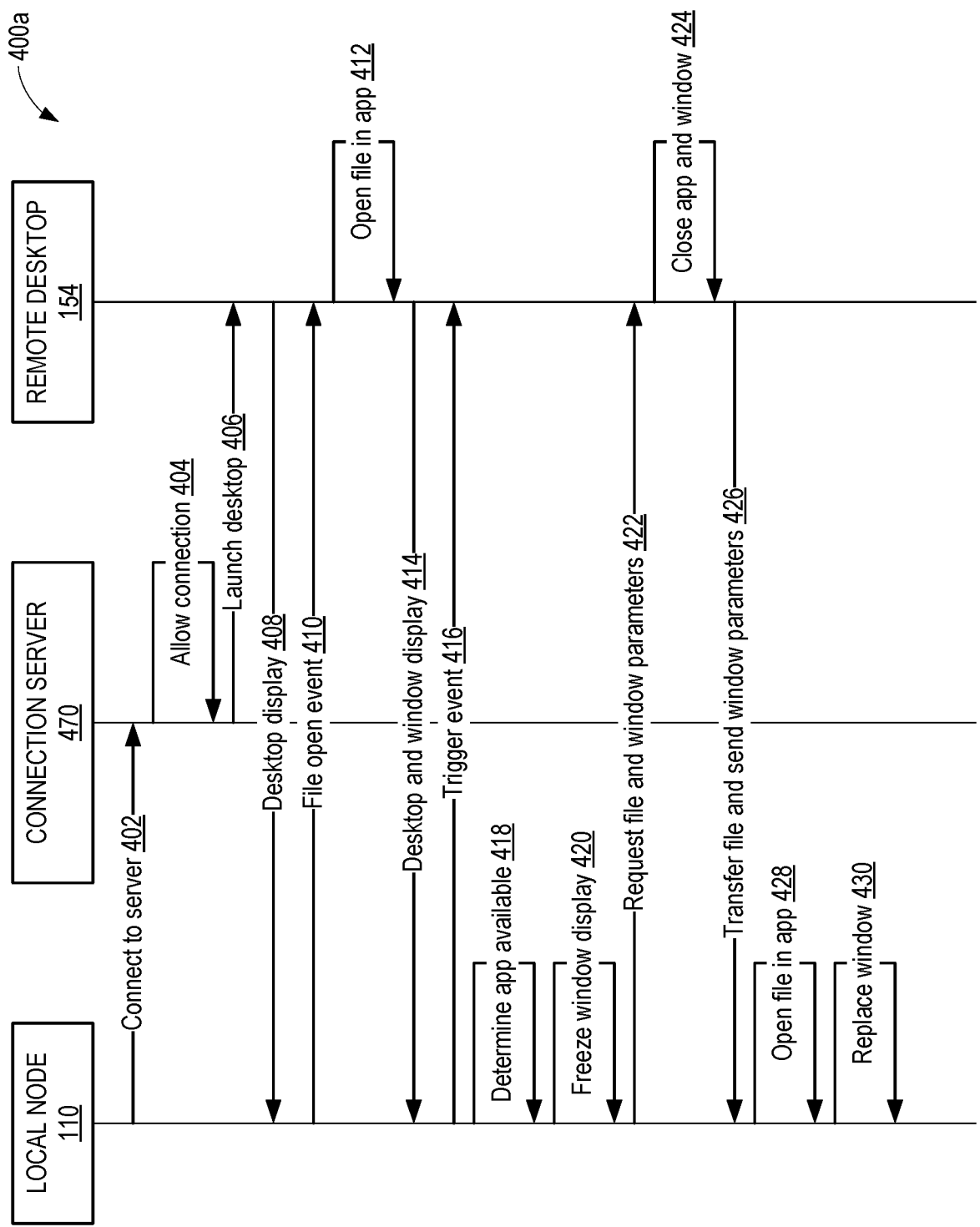

FIGS. 4A and 4B illustrate exemplary message sequences associated with transitioning between local and remote desktops application windows. FIG. 4A illustrates a message sequence diagram 400*a* for transitioning from a remote native application window to a local native application window, in which a local copy of an application is executed. Messages are illustrated among local node 110, a connection server 470, and remote desktop window 154. Connection server 470 may be remote node 150, VM 158, or an intermediary node between local node 110 and remote node 150 in network 190. A similar messaging arrangement exists between local node 110 and remote node 170.

Local node 110 connects to connection server 470 at 402, and connection server 470 validates the connection request at 404. Connection server 470 launches remote desktop window 154 at 406, and remote desktop window 154 provides desktop display graphical information to local node 110 at 408. A file open event 410 results in application 162 opening file 160 on remote node 150, at 412. Graphical display information for remote desktop window 154, with application window 156, is provided to local node 110 at 414. Opening file 160 with application 162 thus generates application window 156 on remote desktop window 154 on user display 200. A trigger event is detected, such as application window 156 is moved to the edge of remote desktop window 154 using pointer input 132.

At 418, a determination is made that a copy of a suitable application, specifically application 122, is available on local node 110. If a copy of a suitable application is not available on local node 110, a seamless window is used instead. This is shown in FIG. 4B. However, for message sequence diagram 400*a*, a copy of a suitable application is available on local node 110*a*. The display of application window 156 is frozen at 420, to avoid the window display disappearing as replacement application window 116 is prepared. Highlighting of remote desktop window 154 and/or application window 156 may occur at 420.

A request to transfer file 160 and copy window parameters 164 is made at 422. At 424, file 160 is saved and application 162 and application window 156 are closed. The display of application window 156 on local node 110 still remains frozen, however. At 426, file 160 is transferred across network 190 to become file 120, and at least one application window parameter from window parameters 164 for application window 156 is duplicated to window parameter 124 for application window 116. At 428, file 120 is opened with application 122 to generate application window 116 on desktop window 114. Application window 116 replaces application window 156 on user display 200, at 430.

FIG. 4B illustrates a message sequence diagram 400*b* for transitioning from a remote native application window to a seamless application window, in which a remote copy of an application is executed, but the application window appears to the user as if a local application was executing. Messages 402-416 are as in FIG. 4A. However, at 440, a determination is made that a copy of a suitable application is not available on local node 110. The display of application window 156 is frozen at 442, to avoid the window display disappearing as a seamless application window is prepared. This is when highlighting of remote desktop window 154 and/or application window 156 may occur.

At 444, local node 110 requests a seamless application window. In some examples, it is necessary for an application to be published and entitled as a seamless application, in order to provide a seamless window. Rather than requiring an IT administrator to perform that task, in some examples, this is accomplished as part of messages 444 and 446, if it had not been completed earlier. That is, in some examples, the user has the privileges for publishing applications as seamless applications, and dragging an application window makes the application generating the window into a seamless application for the user. Connection server 470 instructs remote desktop window 154 to close application window 156, at 446.

At 448, file 160 is saved and application 162 and application window 156 are closed. The display of application window 156 on local node 110 still remains frozen, however. At 450, connection server 470 requests a new session 472 of application window 156, and window parameters 164 are forwarded at 452. At 454, application 162 (executing as a seamless application) opens file 160 generate application window 156 as a seamless application window 156. Seamless window display graphical information is provided to local node 110 at 456. At 458, the seamless application window 156 replaces the prior application window 156 on user display 200.

Figure 5:
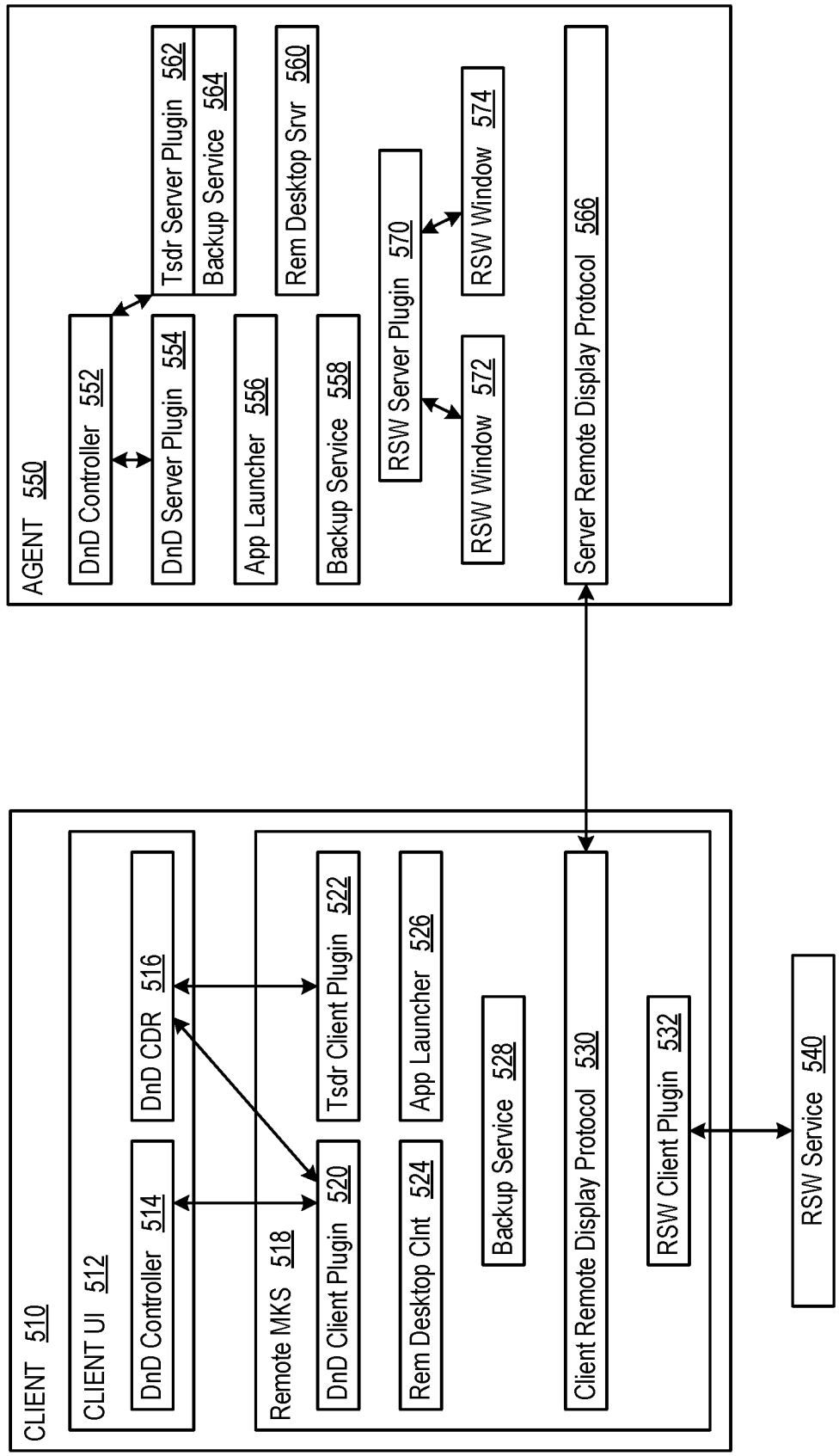
FIG. 5 illustrates additional detail of select components of the architecture of FIG. 1.

FIG. 5 illustrates additional detail of select components of architecture 100 of FIG. 1. For example, display component 142 includes at least some of the illustrated functionality of client 510 of FIG. 5, and display components 168 and 188 each include at least some of the illustrated functionality of agent 550 of FIG. 5. A client UI 512, for example UI 112 of FIG. 1, includes a drag-and-drop (DnD) controller 514 and a DnD client drive redirection (CDR) 516, which is a component that transfers a file from a remote desktop to a temporary directory on the client side, and opens the file using a local application, at the proper file position. On the client side, DnD controller 514 is responsible for obtaining window size and window location, and handling window creation, window destruction, and other operations. A DnD controller 552 provides equivalent function for remote windows on the server side. When a user drags an application window from a remote desktop window to the client side, the mouse focus is ungrabbed and a fake window is drawn on the client side. DnD controller 514 then obtains the window position and notifies DnD controller 552 to close the remote application window. When a user drags a window from the client side to a remote desktop window, DnD controller 552 obtains the window position and notifies DnD controller 514 to close the local application window.

A remote mouse, keyboard and screen (MKS) component 518 provides additional functionality for client 510. A DnD client plugin 520 and a DnD server plugin 554 are plugins for a disk-based backup and recovery solution, and are responsible for communicating between client and agent sides. A backup service 528 provides disk-based backup and recovery services. The agent side has equivalent backup services 558 and 564. A remote desktop client 524 communicates with a remote desktop server 560 to provide a graphical interface over a network connection. A Tsdr client plugin 522 monitors DnD CDR 516, similarly to the manner in which a Tsdr server plugin 562 monitors DnD controller 552. A client remote display protocol 530 works with a server remote display protocol 566 to encode data for network traffic.

App launchers 526 and 556 determine whether the proper application exists on the client or server side (e.g., local node 110 or remote node 150) and launches the application if it is available on the client or agent. In some examples, app launchers 526 and 556 retrieve the default settings for either transferring the window or instead using a seamless or reverse seamless window, initiate a seamless or reverse seamless window process when that is the default, attempt to locate the application on the local or remote node when that is the default, and, initiate a seamless or reverse seamless window process when the application is not available. App launchers 526 and 556 also receive window size and position information from DnD controller 514 or 552.

If a user drags a remote application window to the local desktop window, and app launcher 526 determines that there is no appropriate local application available to open the file, app launcher 526 calls remote desktop client 524 to create a seamless application window and open the file with a remote desktop application. If a user drags a local application window to a remote desktop window, and app launcher 556 determines that there is no appropriate application available on the remote node to open the file, app launcher 556 calls reverse seamless window server plugin 570. Reverse seamless window server plugin 570 receives the windows events of local windows and creates corresponding reverse seamless windows, such as reverse seamless window 572 and reverse seamless window 574, in the remote desktop. For each reverse seamless window, reverse seamless window client plugin 532 detects the uncovered display region and reports the region to reverse seamless window server plugin 570, so that reverse seamless window server plugin 570 is able to send the uncovered display region information to reverse seamless window client plugin 532 for display. Reverse seamless window client plugin 532 also obtains window events from a reverse seamless window service 540 and sends the events to reverse seamless window server plugin 570. Reverse seamless window service 540 tracks window events in the local desktop window.

FIG. 6 illustrates a message sequence diagram 600 associated with client 510 and agent 550 to transform a local application window into a reverse seamless window. At 602, a user 630 drags a window, which is handled by DnD controller 514, and DnD controller 514 sends the window position and size to DnD client plugin 520, at 604. DnD client plugin 520 sends the window position and size to DnD server plugin 554, at 606, and DnD server plugin 554 sends the window position and size to DnD controller 552, at 608. At 610, DnD controller 552 inquires of app launcher 556 whether the proper application is ready to launch, and at 612, app launcher 556 responds that the application is unavailable on the agent (e.g., on the remote node).

At 614, DnD controller 552 notifies DnD controller 514 to keep the application on the client (e.g., on local node 110). Using one or more of its components, MKS component 518 sends window events to reverse seamless window service 540, which sends the window events to reverse seamless window client plugin 532, at 616 and 618, respectively. Reverse seamless window client plugin 532 sends window events to reverse seamless window server plugin 570, at 620. At 622, reverse seamless window server plugin 570 creates reverse seamless window 572, which reports its regions back to reverse seamless window server plugin 570, at 624. At 626, reverse seamless window server plugin 570 sends uncovered display regions to reverse seamless window client plugin 532.

Figure 7A:
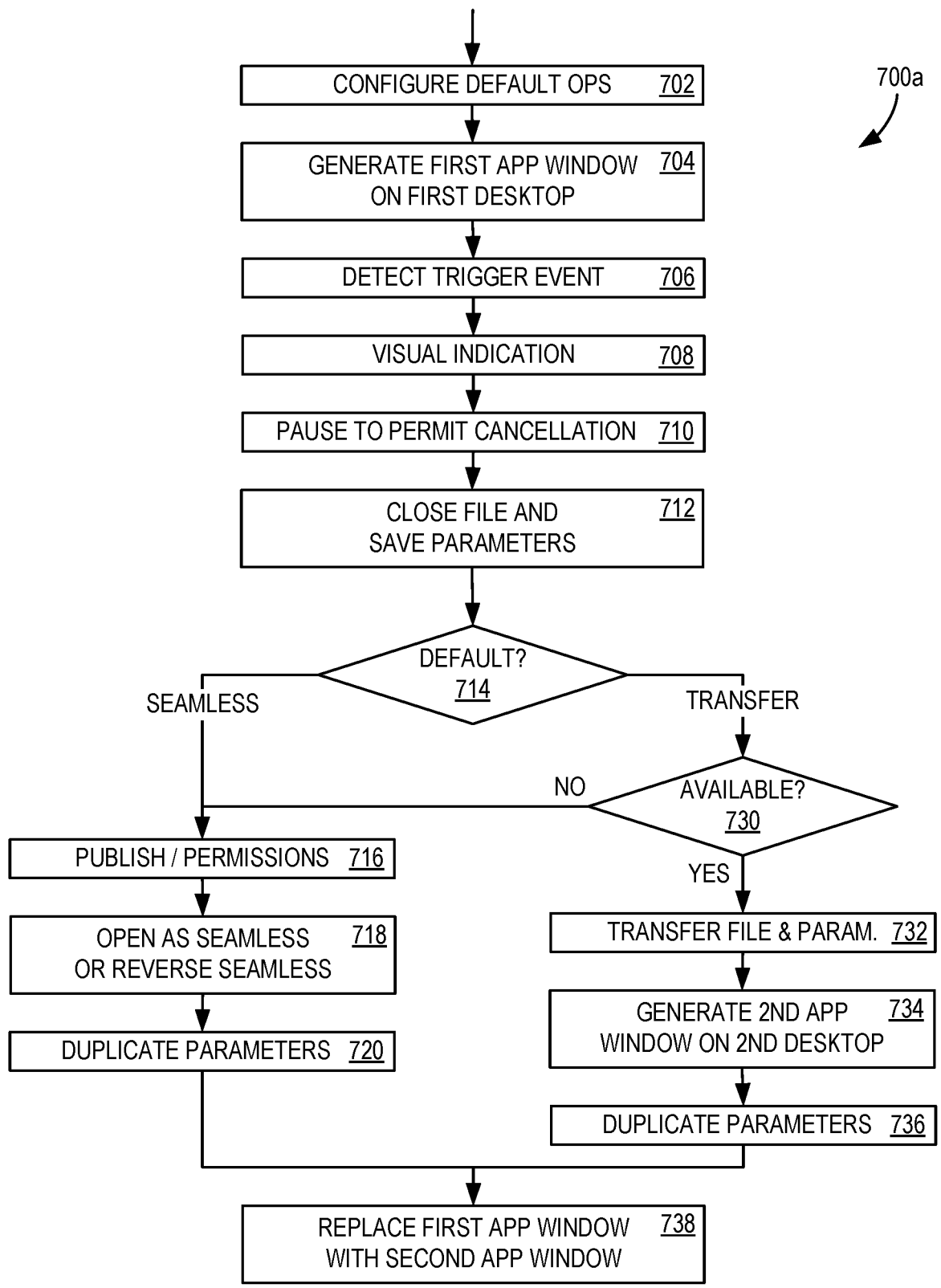
FIG. 7A is a flow chart of exemplary operations associated with the architecture of FIG. 1.

FIG. 7A illustrates a flow chart 700a showing a method of transitioning application windows between local and remote desktops. In some examples, the operations described for flow chart 700a are performed using one or more computing devices 900 of FIG. 9. Default settings are configured in operation 702, for example to default to file transfers or instead using seamless or reverse seamless windows. In some examples, the defaults may be set to prefer local execution, such as transfers from remote to local are performed, but local to remote is handled with a reverse seamless window. In some examples, the defaults may be set to prefer remote execution, such as transfers from local to remote are performed, but remote to local is handled with a seamless window. In some examples, an automated decision is made for the user. In some examples, an automated decision is made for the user to perform local execution first, such as transfers from remote to local are performed, however this transition will be automatically handled with a seamless window, if there is no available local application to launch the transferred file. In some examples, an automated decision is made for the user to perform remote execution first, such as transfers from local to remote are performed, however this transition will be automatically handled with a reverse seamless window if there is no available remote application to launch the transferred file. In some examples, time limits may affect the default settings, such as by turning on or off transfers at selected times.

Operation 704 includes opening a first file with a first application to generate a first application window on a first desktop window on a user display. A trigger event is detected in operation 706. In some examples, the trigger event comprises determining that the first application window is positioned at an edge of a remote desktop window. In operation 708, the user is provided a visual indication of the pending window replacement, such as by highlighting the first application window or the remote desktop window. Operation 710 includes pausing for a delay period, to permit the user to cancel the operation. The first file is closed in operation 712, and the window parameters are saved so that they can be duplicated in the second window.

Operation 714 includes determining a default operation as either transferring the first file or using a seamless or reverse seamless application window. If a seamless or reverse seamless application window is to be used, the application is published as a seamless or reverse seamless application in operation 716. In some examples, this requires providing the user the proper permissions to publish the application as necessary. Based at least on the default operation being to use a seamless application window or a reverse seamless application window, operation 718 includes replacing the first application window with a seamless application window or a reverse seamless application window. In some examples, this is accomplished by opening the first file with first application again, but in a different window. Operation 720 includes duplicating at least one application window parameter from the first application window to the seamless or reverse seamless application window. In some examples, operations 718 and 720 are performed together, such that some parameters are set prior to opening the file, and some parameters are set after the window has been generated.

If, however, the default operation is to transfer the file, then decision operation 730 includes, based at least on a trigger event for transitioning the first application window from the first desktop window to a second desktop window, determining whether a second application is available for the second desktop window to produce a version of the first application window. If not, flow chart 700a moves to operation 716 to use a seamless or reverse seamless window. In such a scenario, operation 716 includes based at least on the second application not being available, replacing the first application window with a seamless application window or a reverse seamless application window. In some examples, determining whether the second application is available is conditioned upon determining that the default operation is transferring the first file.

If the application is available, operation 732 includes, based at least on the second application being available, transferring the first file across a network to become a second file. The window parameters are also sent in operation 732. Operation 734 includes opening the second file with the second application to generate a second application window on the second desktop window, and operation 736 includes duplicating at least one application window parameter from the first application window to the second application window. In some examples, the at least one application window parameter includes one or more of the following: window size, window position, file position, and window display options. In some examples, at least one window display option includes one or more of the following: formatting symbol display, font, zoom, layout, and a navigation aid. Operation 738 includes window replacing the first application window on the user display with the second application window.

In some examples, for operations 704-738, the first file is a local file, the first application is a local application, the first desktop window is a local desktop window, the second file is a remote file, the second application is a remote application, and the second desktop window is a remote desktop window. In some examples, for operations 704-738, the first file is a remote file, the first application is a remote application, the first desktop window is a remote desktop window, the second file is a local file, the second application is a local application, and the second desktop window is a local desktop window.

Figure 7B:
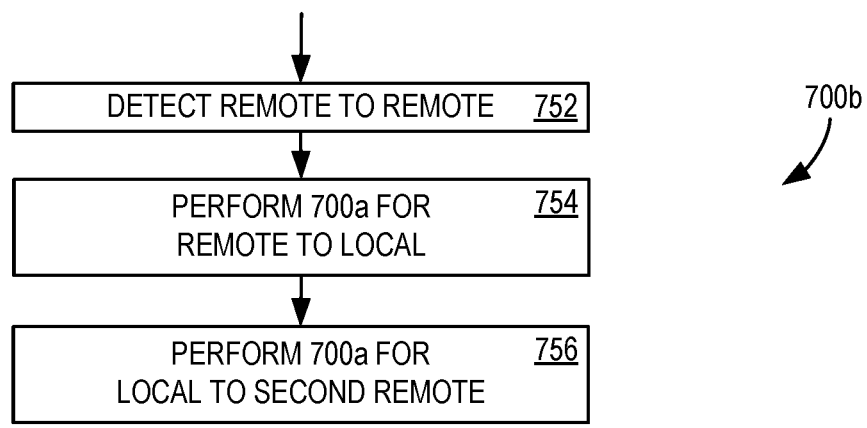
FIG. 7B is another flow chart of exemplary operations associated with the architecture of FIG. 1.

FIG. 7B illustrates a flow chart 700b showing a method of transitioning application windows between two remote desktops. In some examples, the operations described for flow chart 700b are performed using one or more computing devices 900 of FIG. 9. Operation 752 includes detecting a direct remote to remote transfer. Operation 754 performs flow chart 700a, at least operations 704-738, for a remote to local transfer, and operation 756 performs flow chart 700a, at least operations 704-738, for a local to remote transfer for the destination (second) remote node. In this scenario, operations 704-738 in the second pass through flow chart 700a include transferring the second file across a network to become a third file; and opening the third file with a third application to generate a third application window on a third desktop window, the third application window replacing the first application window on the user display. In such examples, the second file is a remote file, the third file is a remote file on a second remote node, the third application is a remote application on the second remote node, and the third desktop window is a remote desktop window on the second remote node.

Alternatively, operations 704-712 and 732-738 of flow chart 700a are performed transferring the file and the application window directly from the first remote node to the second (destination) remote node, without opening a window on the local node as an intermediate operation.

Figure 8:
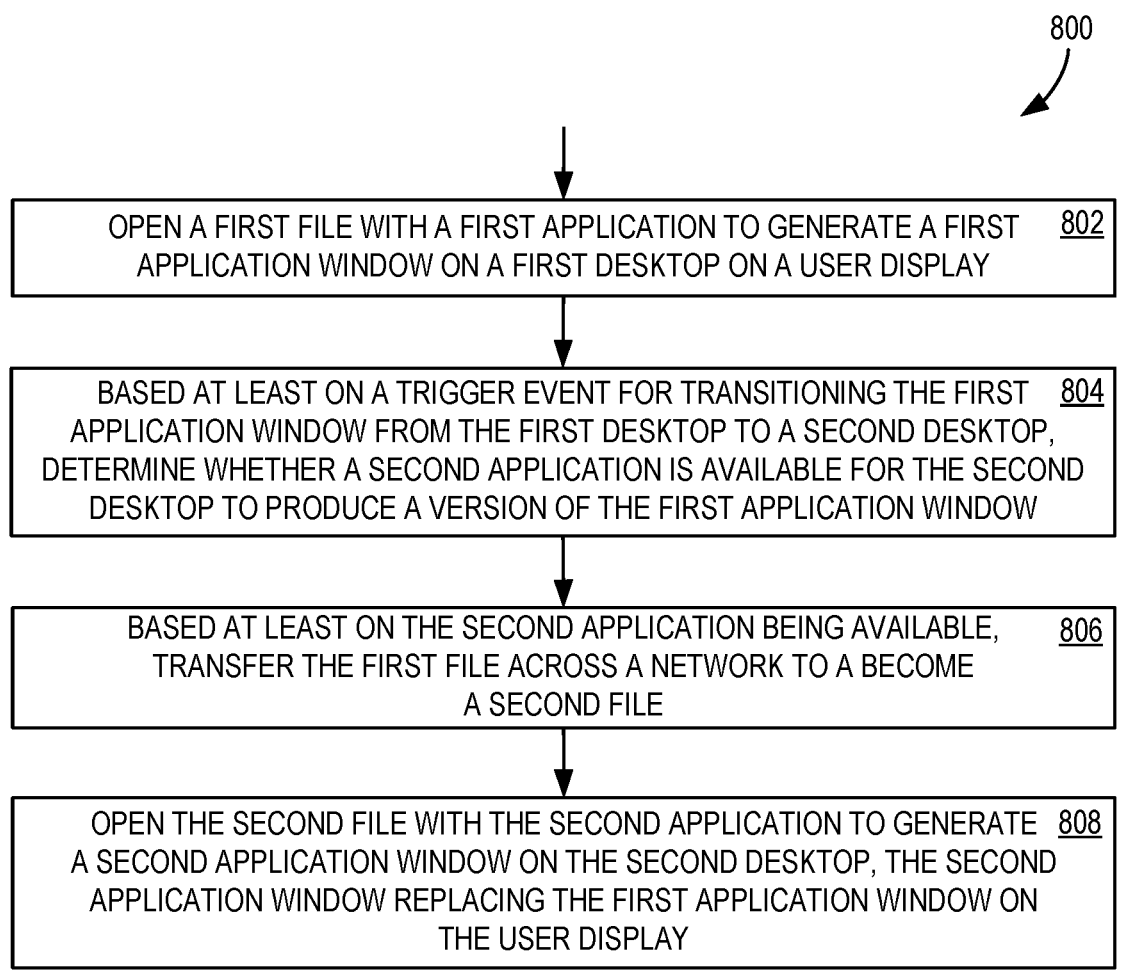
FIG. 8 is another flow chart of exemplary operations associated with the architecture of FIG. 1.

FIG. 8 illustrates a flow chart 800 showing a method of transitioning application windows between local and remote desktops. In some examples, the operations described for flow chart 800 are performed using one or more computing devices 900 of FIG. 9. Operation 802 includes opening a first file with a first application to generate a first application window on a first desktop window on a user display. Operation 804 includes based at least on a trigger event for transitioning the first application window from the first desktop window to a second desktop window, determining whether a second application is available for the second desktop window to produce a version of the first application window. Operation 806 includes based at least on the second application being available, transferring the first file across a network to become a second file. Operation 808 includes opening the second file with the second application to generate a second application window on the second desktop window, the second application window replacing the first application window on the user display.

In some examples that transition an application window from a local desktop window to a remote desk-top window, the first file is a local file, the first application is a local application, the first desktop window is a local desktop window, the second file is a remote file, the second application is a remote application, and the second desktop window is a remote desktop window. In some examples that transition an application window from a remote desktop window to a local desktop window, the first file is a remote file, the first application is a remote application, the first desktop window is a remote desktop window, the second file is a local file, the second application is a local application, and the second desktop window is a local desktop window.

Figure 9:
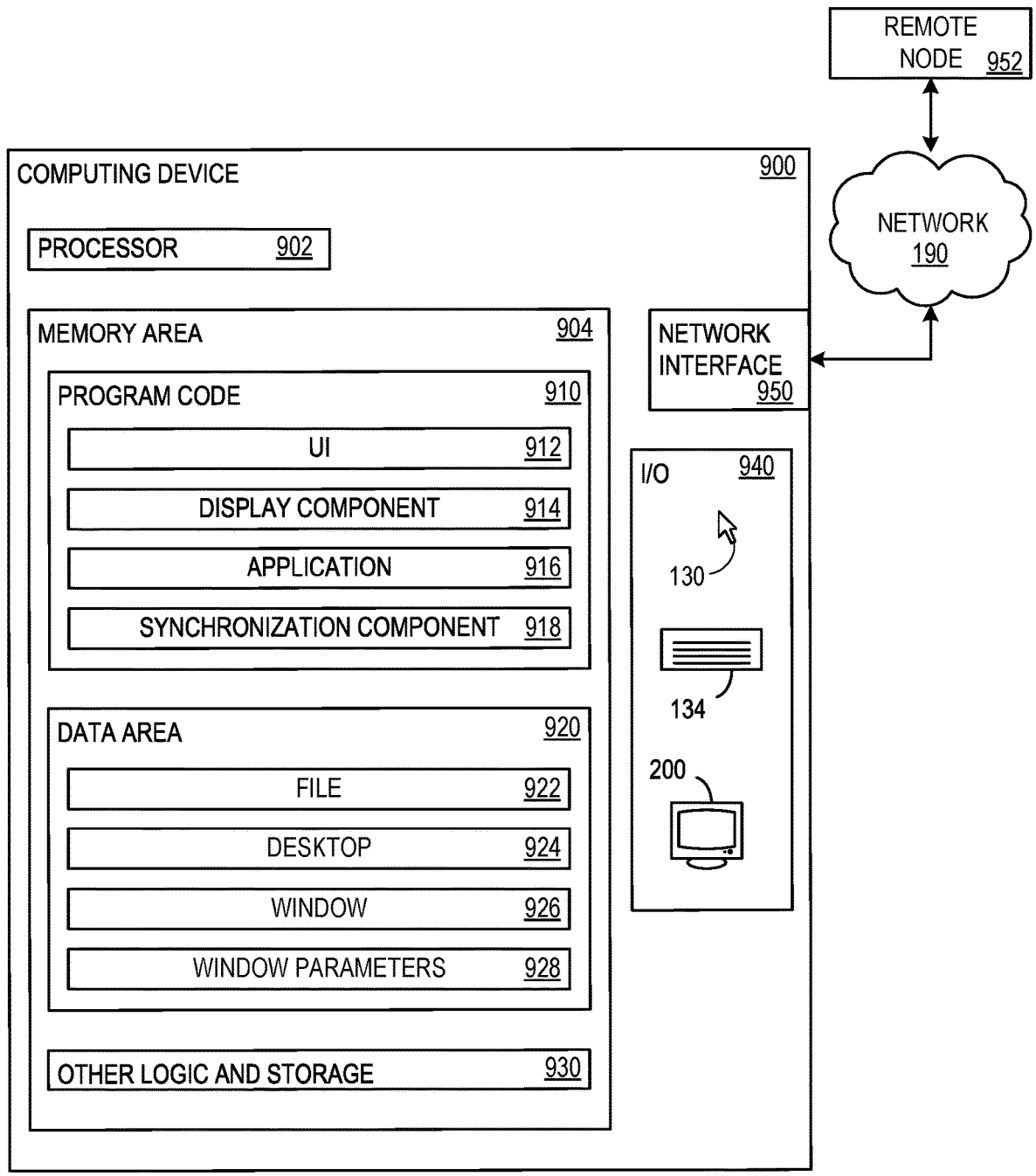
FIG. 9 illustrates a block diagram of a computing device that may be used with the architecture of FIG. 1, according to an example embodiment.

FIG. 9 illustrates a block diagram of computing device 900 that may be used with architecture 100 of FIG. 1. With reference to FIG. 1, computing device 900 may be used for any of local node 110, remote node 150, or remote node 170. Computing device 900 has at least a processor 902 and a memory area 904 (or memory 904) that holds program code 910, a data area 920, and other logic and storage 930. Memory area 904 is any device allowing information, such as computer executable instructions and/or other data, to be stored and retrieved. For example, memory area 904 may include one or more random access memory (RAM) modules, flash memory modules, hard disks, solid-state disks, and/or optical disks. Program code 910 comprises computer executable instructions, and computer executable components including a UI 912 that represents any of UIs 112, 152, and 172; a display component 914 that represents any of display components 142, 168, and 188; an application 916 that represents any of applications 122, 162, and 182; and a synchronization component 918 that represents any of synchronization components 126, 166, and 186.

Data area 920 holds a file 922 that represents any of files 120, 160, and 180; a desktop 924 that represents any of local desktop window 114, and remote desktops 154 and 164; a window 926 that represents any of application windows 116, 156, and 176; and window parameters 928 that represents any of window parameters 124, 164, and 184. Other logic and storage 930 holds any other components that are needed to perform the operations described herein. An input/output (I/O) component 940 includes pointer device 130, keyboard 134, and user display 200. A network interface 950 permits communication over network 190 with remote node 952, which may represent any of the nodes identified in FIG. 1. In some examples, network 190 is the internet, an intranet, a local area network (LAN), a wide area network (WAN), a cabled network, and/or a wireless network.

Computing device 900 represents any device or computer system executing instructions (e.g., as application programs, operating system functionality, or both) to implement the operations and functionality described herein. Computing device 900 may include any portable or non-portable device including a mobile telephone, laptop, tablet, computing pad, netbook, gaming device, portable media player, desktop personal computer, kiosk, embedded device, and/or tabletop device. Additionally, computing device 900 may represent a group of processing units or other computing devices, such as in a cloud computing system or service. Processor 902 may include any quantity of processing units and may be programmed to execute any components of program code 910 comprising computer executable instructions for implementing aspects of the disclosure. In some embodiments, processor 902 is programmed to execute instructions such as those illustrated in the figures.

Additional Examples

An example system for transitioning application windows between local and remote desktops comprises: a processor; and a non-transitory computer readable medium having stored thereon program code, the program code causing the processor to: open a first file with a first application to generate a first application window on a first desktop window on a user display; based at least on a trigger event for transitioning the first application window from the first desktop window to a second desktop window, determine whether a second application is available for the second desktop window to produce a version of the first application window; and based at least on the second application being available: transfer the first file across a network to become a second file; and open the second file with the second application to generate a second application window on the second desktop window, the second application window replacing the first application window on the user display.

An exemplary method of transitioning application windows between local and remote desktops comprises: opening a first file with a first application to generate a first application window on a first desktop window on a user display; based at least on a trigger event for transitioning the first application window from the first desktop window to a second desktop window, determining whether a second application is available for the second desktop window to produce a version of the first application window; and based at least on the second application being available: transferring the first file across a network to become a second file; and opening the second file with the second application to generate a second application window on the second desktop window, the second application window replacing the first application window on the user display.

One or more exemplary non-transitory computer storage medium have computer-executable instructions that, upon execution by a processor, cause the processor to at least perform operations that comprise: opening a first file with a first application to generate a first application window on a first desktop window on a user display; based at least on a trigger event for transitioning the first application window from the first desktop window to a second desktop window, determining whether a second application is available for the second desktop window to produce a version of the first application window; and based at least on the second application being available: transferring the first file across a network to become a second file; and opening the second file with the second application to generate a second application window on the second desktop window, the second application window replacing the first application window on the user display.

Alternatively, or in addition to the other examples described herein, examples include any combination of the following:

the first file is a local file, the first application is a local application, the first desktop window is a local desktop window, the second file is a remote file, the second application is a remote application, and the second desktop window is a remote desktop window;

the first file is a remote file, the first application is a remote application, the first desktop window is a remote desktop window, the second file is a local file, the second application is a local application, and the second desktop window is a local desktop window;

highlighting the first application window or the remote desktop window;

pausing for a delay period;

the trigger event comprises determining that the first application window is positioned at an edge of a remote desktop window;

based at least on the second application not being available replacing the first application window with a seamless application window or a reverse seamless application window;

transferring the second file across a network to become a third file;

opening the third file with a third application to generate a third application window on a third desktop window, the third application window replacing the first application window on the user display;

the second file is a remote file, the third file is a remote file on a second remote node, the third application is a remote application on the second remote node, and the third desktop window is a remote desktop window on the second remote node;

duplicating at least one application window parameter from the first application window to the second application window;

the at least one application window parameter selected from the list consisting of: window size, window position, file position, and window display options;

at least one window display option is selected from the list consisting of: formatting symbol display, font, zoom, layout, and a navigation aid;

determining a default operation as either transferring the first file or using a seamless or reverse seamless application window;

determining whether the second application is available is conditioned upon determining that the default operation is transferring the first file; and based at least on the default operation being using a seamless application window or a reverse seamless application window, replacing the first application window with a seamless application window or a reverse seamless application window.

Exemplary Operating Environment

The operations described herein may be performed by a computer or computing device. The computing devices comprise processors and computer readable media. By way of example and not limitation, computer readable media comprise computer storage media and communication media. Computer storage media include volatile and non-volatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special purpose computing device when programmed to execute the instructions described herein. The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The term "computing device," "computer system," and the like are used herein to refer to any device with processing capability such that it can execute instructions. Those skilled in the art will realize that such processing capabilities are incorporated into many different devices and therefore the terms "computer", "server", and "computing device" each may include PCs, servers, laptop computers, mobile telephones (including smart phones), tablet computers, and many other devices. Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of transitioning application windows between local and remote desktops, the method comprising:
   opening a first file with a first application to generate a first application window on a first desktop window on a user display;
   based at least on a trigger event for transitioning the first application window from the first desktop window to a second desktop window, determining that a second application is not available for the second desktop window to produce a version of the first application window; and
   replacing the first application window with a seamless application window or a reverse seamless application window.

2. The method of claim 1, wherein the first file is a local file, the first application is a local application, the first desktop window is a local desktop window, the second application is a remote application, and the second desktop window is a remote desktop window.

3. The method of claim 1, wherein the first file is a remote file, the first application is a remote application, the first desktop window is a remote desktop window, the second application is a local application, and the second desktop window is a local desktop window.

4. The method of claim 1, further comprising:
   based at least on a trigger event for transitioning the first application window from the first desktop window to a second desktop window, providing to a user a visual indication that the transitioning is pending.

5. The method of claim 1, wherein replacing the first application window with a seamless application window or a reverse seamless application window includes determining that the first application is published as a seamless application.

6. The method of claim 1, further comprising:
   maintaining an appearance of the seamless application window or the reverse seamless application window unchanged upon transitioning of the first application window from the first desktop window to the second desktop window.

7. The method of claim 1, further comprising:
   freezing the first application window to avoid the first application window disappearing while a second application window is prepared to replace the first application window.

8. A computer system for transitioning application windows between local and remote desktops, the computer system comprising:
   a processor; and
   a non-transitory computer readable medium having stored thereon program code, the program code causing the processor to:
      open a first file with a first application to generate a first application window on a first desktop window on a user display;
      based at least on a trigger event for transitioning the first application window from the first desktop window to a second desktop window, determine that a second application is not available for the second desktop window to produce a version of the first application window; and
      replace the first application window with a seamless application window or a reverse seamless application window.

9. The computer system of claim 8, wherein the first file is a local file, the first application is a local application, the first desktop window is a local desktop window, the second application is a remote application, and the second desktop window is a remote desktop window.

10. The computer system of claim 8, wherein the first file is a remote file, the first application is a remote application, the first desktop window is a remote desktop window, the second application is a local application, and the second desktop window is a local desktop window.

11. The computer system of claim 8, wherein the program code is further operative to:
    based at least on a trigger event for transitioning the first application window from the first desktop window to a second desktop window, provide to a user a visual indication that the transitioning is pending.

12. The computer system of claim 8, wherein replacing the first application window with a seamless application window or a reverse seamless application window includes determining that the first application is published as a seamless application.

13. The computer system of claim 8, wherein the program code is further operative to:
    maintain an appearance of the seamless application window or the reverse seamless application window unchanged upon transitioning of the first application window from the first desktop window to the second desktop window.

14. The computer system of claim 8, wherein the program code is further operative to:
freeze the first application window to avoid the first application window disappearing while a second application window is prepared to replace the first application window.

15. A non-transitory computer storage medium having stored thereon program code executable by a first computer system at a first site, the program code embodying a method comprising:
opening a first file with a first application to generate a first application window on a first desktop window on a user display;
based at least on a trigger event for transitioning the first application window from the first desktop window to a second desktop window, determining that a second application is not available for the second desktop window to produce a version of the first application window; and
replacing the first application window with a seamless application window or a reverse seamless application window.

16. The non-transitory computer storage medium of claim 15,
wherein the first file is a local file, the first application is a local application, the first desktop window is a local desktop window, the second application is a remote application, and the second desktop window is a remote desktop window; or
wherein the first file is a remote file, the first application is a remote application, the first desktop window is a remote desktop window, the second application is a local application, and the second desktop window is a local desktop window.

17. The non-transitory computer storage medium of claim 15, wherein the program code further comprises:
based at least on a trigger event for transitioning the first application window from the first desktop window to a second desktop window, providing to a user a visual indication that the transitioning is pending.

18. The non-transitory computer storage medium of claim 15, wherein replacing the first application window with a seamless application window or a reverse seamless application window includes determining that the first application is published as a seamless application.

19. The non-transitory computer storage medium of claim 15, wherein the program code further comprises:
maintaining an appearance of the seamless application window or the reverse seamless application window unchanged upon transitioning of the first application window from the first desktop window to the second desktop window.

20. The non-transitory computer storage medium of claim 15, wherein the program code further comprises:
freezing the first application window to avoid the first application window disappearing while a second application window is prepared to replace the first application window.

* * * * *